United States Patent
Ishiguro et al.

(10) Patent No.: US 12,087,911 B2
(45) Date of Patent: *Sep. 10, 2024

(54) METHOD OF MANUFACTURING A SOLID ELECTROLYTE MEMBRANE

(71) Applicants: THE JAPAN STEEL WORKS, LTD., Tokyo (JP); NATIONAL UNIVERSITY CORPORATION KYOTO INSTITUTE OF TECHNOLOGY, Kyoto (JP)

(72) Inventors: Ryo Ishiguro, Tokyo (JP); Satoru Nakamura, Tokyo (JP); Midori Takasaki, Kyoto (JP); Sotaro Nambu, Kyoto (JP)

(73) Assignees: THE JAPAN STEEL WORKS, LTD., Shinagawa (JP); NATIONAL UNIVERSITY CORPORATION KYOTO INSTITUTE OF TECHNOLOGY, Kyoto (JP)

( * ) Notice: Subject to any disclaimer, the term of this patent is extended or adjusted under 35 U.S.C. 154(b) by 247 days.

This patent is subject to a terminal disclaimer.

(21) Appl. No.: 17/594,650

(22) PCT Filed: Apr. 23, 2020

(86) PCT No.: PCT/JP2020/017501
§ 371 (c)(1),
(2) Date: Oct. 25, 2021

(87) PCT Pub. No.: WO2020/218422
PCT Pub. Date: Oct. 29, 2020

(65) Prior Publication Data
US 2022/0181703 A1 Jun. 9, 2022

(30) Foreign Application Priority Data
Apr. 26, 2019 (JP) .................................. 2019-085279

(51) Int. Cl.
*B29C 48/36* (2019.01)
*D01D 5/00* (2006.01)
(Continued)

(52) U.S. Cl.
CPC ...... *H01M 10/0585* (2013.01); *D01D 5/0023* (2013.01); *D01D 5/0038* (2013.01);
(Continued)

(58) Field of Classification Search
CPC .. B29C 48/36; B29D 99/005; B29K 2023/06; B29K 2023/12; B29K 2401/00;
(Continued)

(56) References Cited

U.S. PATENT DOCUMENTS 6,288,144 B1 * 9/2001 Roberts ................ B32B 15/08
523/217
2011/0275520 A1  11/2011 Frey et al.
(Continued)

FOREIGN PATENT DOCUMENTS

CN    108884595 A    11/2018
CN    109119683 A    1/2019
(Continued)

OTHER PUBLICATIONS

Office Action issued Jun. 6, 2023, in Japanese Patent Application No. 2019-085279.
(Continued)

*Primary Examiner* — Leo B Tentoni
(74) *Attorney, Agent, or Firm* — Potomac Law Group, PLLC

(57) ABSTRACT

A method of manufacturing an all-solid-state battery and an apparatus for manufacturing the same are provided. The method of manufacturing the all-solid-state battery includes: (a) a step of forming a non-woven fabric having a fiber made of a resin; (b) a step of applying a slurry containing solid
(Continued)

electrolyte particles onto the non-woven fabric; (c) a step of drying the slurry on the non-woven fabric by a heater; (d) a step of pressurizing the slurry on the non-woven fabric by a roller; (e) a step of forming a positive electrode member on one surface of the solid electrolyte membrane; and (f) a step of forming a negative electrode member on the other surface of the solid electrolyte membrane. The step (a) is a step of forming the non-woven fabric by making a resin containing a polar filler fibrous by a laser electrospinning method. By such a method, the all-solid-state battery (a laminated body of a positive electrode member, a solid electrolyte membrane, and a negative electrode member) can be efficiently manufactured.

7 Claims, 15 Drawing Sheets

(51) Int. Cl.
| | | |
|---|---|---|
| D01D 10/02 | (2006.01) | |
| D04H 3/007 | (2012.01) | |
| H01M 6/18 | (2006.01) | |
| H01M 10/0562 | (2010.01) | |
| H01M 10/0585 | (2010.01) | |
| H01M 50/403 | (2021.01) | |
| H01M 50/406 | (2021.01) | |
| B29D 99/00 | (2010.01) | |
| B29K 23/00 | (2006.01) | |
| B29K 401/00 | (2006.01) | |
| B29L 31/00 | (2006.01) | |

(52) U.S. Cl.
CPC ......... D01D 5/0061 (2013.01); D01D 5/0084 (2013.01); D01D 5/0092 (2013.01); H01M 6/187 (2013.01); H01M 6/188 (2013.01); H01M 10/0562 (2013.01); *B29D 99/005* (2013.01); *B29K 2023/06* (2013.01); *B29K 2023/12* (2013.01); *B29K 2401/00* (2013.01); *B29L 2031/755* (2013.01); *D10B 2321/021* (2013.01); *D10B 2321/022* (2013.01)

(58) Field of Classification Search
CPC ............ B29L 2031/755; D01D 5/0023; D01D 5/0038; D01D 5/0084; D04H 3/007; D06M 10/06; D06M 11/84; D06M 2101/20; D10B 2321/021; D10B 2321/022; H01M 6/187; H01M 6/188; H01M 50/403; H01M 50/406; H01M 2300/068
USPC .............. 264/136, 211, 211.21, 211.22, 234, 264/331.17, 465, 482; 429/304
See application file for complete search history.

(56) References Cited

U.S. PATENT DOCUMENTS

| | | | |
|---|---|---|---|
| 2013/0085212 | A1 | 4/2013 | Lagaron Cabello et al. |
| 2014/0121307 | A1* | 5/2014 | Cao .................. C08L 51/06 524/73 |
| 2017/0298535 | A1* | 10/2017 | Tei .................. D01D 5/0092 |
| 2018/0375148 | A1 | 12/2018 | Yersak et al. |
| 2019/0237731 | A1 | 8/2019 | Park et al. |
| 2019/0288332 | A1 | 9/2019 | Hotta et al. |
| 2019/0372149 | A1 | 12/2019 | Cho et al. |

FOREIGN PATENT DOCUMENTS

| | | |
|---|---|---|
| CN | 109244327 A | 1/2019 |
| JP | H07-335216 A | 12/1995 |
| JP | H07-335217 A | 12/1995 |
| JP | H07-335218 A | 12/1995 |
| JP | 2007262644 A | 10/2007 |
| JP | 2009-299212 A | 12/2009 |
| JP | 2010-250982 A | 11/2010 |
| JP | 2013-127982 A | 6/2013 |
| JP | 2014-143006 A | 8/2014 |
| JP | 2017-103146 A | 6/2017 |
| JP | 2017-183111 A | 10/2017 |
| JP | 2018101641 A | 6/2018 |
| JP | 2018-204140 A | 12/2018 |
| JP | 2019-160748 A | 9/2019 |
| WO | WO 2018/212568 A1 | 11/2018 |
| WO | WO 2019/065066 A1 | 4/2019 |
| WO | WO 2019/208347 A1 | 10/2019 |

OTHER PUBLICATIONS

International Search Report from International Patent Application No. PCT/JP2020/017501, Jul. 28, 2020.
Office Action issued Aug. 14, 2023, in Indian Patent Application No. 202117048298.
Office Action issued Aug. 8, 2023, in Chinese Patent Application No. 202080030604.4.
International Search Report from International Patent Application No. PCT/JP2020/017491, Jul. 28, 2020.
Office Action issued Sep. 28, 2023, in Chinese Patent Application No. 202080030573.2.
Office Action issued Jun. 1, 2023, in Chinese Patent Application No. 202080030573.2.
Office Action issued Mar. 28, 2023, in Japanese Patent Application No. 2019-084028.
Office Action issued Nov. 22, 2022, in Chinese Patent Application No. 202080030573.2.
Piyaporn Kampeerapappun: "The electrospun polyhydroxybutyrate fibers reinforced with cellulose nanocrystals: Morphology and properties", Journal of Applied Polymer Science, vol. 133, No. 20, Feb. 3, 2016 (Feb. 3, 2016), pp. n/a-n/a, XP55254431, ISSN: 0021-8995, DOI: 10.1002/app.43273.
Extended European search report issued Dec. 16, 2022, in European Patent Application No. 20794655.9.
Office Action issued Mar. 6, 2024, in Chinese Patent Application No. 202080030573.2.
Office Action issued May 3, 2024, in Taiwanese Patent Application No. 109113635.
Office Action issued May 3, 2024, in Taiwanese Patent Application No. 109113634.
Office Action issued Jun. 18, 2024, in U.S. Appl. No. 17/594,611.

* cited by examiner (a)

(b)

(c)

(a)

(b)

(c)

(a)

(b)

METHOD OF MANUFACTURING A SOLID ELECTROLYTE MEMBRANE

TECHNICAL FIELD

The present invention relates to a method of manufacturing a solid electrolyte membrane, a method of manufacturing an all-solid-state battery, an apparatus for manufacturing a solid electrolyte membrane, and an apparatus for manufacturing an all-solid-state battery.

BACKGROUND ART

Secondary batteries have been developed in the order of lead batteries, nickel-cadmium batteries, nickel metal hydride batteries (Ni-MH batteries), and lithium batteries (LIB) in broad terms. As for the usage thereof, the demand as the power source for mobile phones, notebook computers, and especially electric vehicles (EV) has been rapidly expanding. Among them, LIB is the mainstream of the secondary battery because it has many advantages such as high energy density, high charge/discharge energy, and compact packaging as compared with other secondary batteries. It is known that the LIB has at least three layers of a positive electrode, a separator, and a negative electrode, and is formed to have a structure in which these three layers are covered with an electrolyte. An organic solvent, which is a flammable substance, is generally used as the electrolyte, but recently, an all-solid-state battery has been attracting attention in order to develop a battery with higher safety. In the all-solid-state battery, a flammable organic electrolytic solution is replaced with a non-flammable inorganic solid electrolyte or the like, and its safety is improved as compared with the conventional batteries. Also, in such an all-solid-state battery, further improvement is expected in terms of battery performance, and for example, higher energy density of the battery is expected.

For example, Patent Document 1 (Japanese Unexamined Patent Application Publication No. 2010-250982) discloses a sheet for solid electrolyte obtained by molding the powder containing solid electrolyte glass particles containing Li, P, and S, wherein the standard deviations of the area ratios of the peaks obtained by the waveform separation of the peak present between 330 $cm^{-1}$ to 450 $cm^{-1}$ of the Raman spectrum measured repeatedly for the glass particles are all less than 4.0.

Also, Patent Document 2 (Japanese Unexamined Patent Application Publication No. 2017-103146) discloses a technology related to a solid electrolyte sheet and a method of manufacturing the same that can give excellent energy density and output characteristics to an all-solid-state battery and make it possible to produce a large number of all-solid-state batteries by the continuous process. Specifically, the solid electrolyte sheet includes a solid electrolyte and a support, the support has a plurality of through holes, and the solid electrolyte is filled in the through holes. The method of manufacturing the solid electrolyte sheet includes a step of filling a plurality of through holes formed on the support with the solid electrolyte, and a step of pressing the support in which the through holes are filled with the solid electrolyte.

Further, Patent Document 3 (Japanese Unexamined Patent Application Publication No. 2018-204140) discloses a technology for fabricating a PET fiber web by the laser electrospinning (LES) method.

RELATED ART DOCUMENTS

Patent Documents

Patent Document 1: Japanese Unexamined Patent Application Publication No. 2010-250982
Patent Document 2: Japanese Unexamined Patent Application Publication No. 2017-103146
Patent Document 3: Japanese Unexamined Patent Application Publication No. 2018-204140

SUMMARY OF THE INVENTION

Problems to be Solved by the Invention

In the all-solid-state battery in Patent Document 1, for example, the solid electrolyte glass particle powder containing elements such as Li and others is molded to form a sheet, and this sheet is applied to a solid electrolyte. However, since the electrical conduction in the solid electrolyte formed only of the powder material is made by the contact between powders, the contact area becomes small and the output characteristics tend to be inferior to those of the lithium battery using the electrolytic solution. Further, when a powder material is used, it is difficult to form a thin film sheet composed of a layer made of a single material, and the manufacturing process tends to be complicated.

On the other hand, in Patent Document 2 mentioned above, the solid electrolyte sheet (thickness: 37 to 138 μm) is manufactured by filling a plurality of through holes having a square shape with a side of 200 to 800 μm, which is formed by a photo-etching method in a polyimide sheet-like support, with a solid electrolyte, and then performing the heating and pressurizing process with a press machine. However, in this case, since a wet etching method using a chromium-based solvent is used when penetrating the polyimide sheet serving as a support, a harmful organic solvent is used, which poses serious cost and environmental problems. In addition, since the size of the opening is large and the specific gravity of the solid electrolyte is large, the solid electrolyte may gradually fall off from the sheet support in the case of binderless, and the durability tends to be low. Furthermore, since the solid electrolyte layer is thick, the resistance between electrodes becomes high.

From the above, the inventors have reached the knowledge that a high-strength, high-heat-resistant nanofiber non-woven fabric having a small thickness and fine porosity is suitable as a support of a solid electrolyte powder in order to obtain a better solid electrolyte membrane, and have found out a method of manufacturing a solid electrolyte membrane, a method of manufacturing an all-solid-state battery, an apparatus for manufacturing a solid electrolyte membrane, and an apparatus for manufacturing an all-solid-state battery as a result of the diligent studies by applying the laser electrospinning (LES) technology (Patent Document 3).

The other problems and novel features will be apparent from the description of this specification and the accompanying drawings.

Means for Solving the Problems

An outline of a typical embodiment disclosed in this application will be briefly described as follows.

A method of manufacturing a solid electrolyte membrane described in an embodiment disclosed in this application includes: (a) a step of forming a non-woven fabric including a fiber made of a resin; (b) a step of applying a slurry containing solid electrolyte particles onto the non-woven fabric; (c) a step of drying the slurry on the non-woven fabric by a heater; and (d) a step of pressurizing the slurry on the non-woven fabric by a roller.

A method of manufacturing an all-solid-state battery described in an embodiment disclosed in this application includes: (a) a step of forming a non-woven fabric including a fiber made of a resin; (b) a step of applying a slurry containing solid electrolyte particles onto the non-woven fabric; (c) a step of drying the slurry on the non-woven fabric by a heater; (d) a step of pressurizing the slurry on the non-woven fabric by a roller; (e) a step of forming a positive electrode member on one surface of the solid electrolyte membrane formed in the step (d); and (f) a step of forming a negative electrode member on the other surface of the solid electrolyte membrane.

An apparatus for manufacturing a solid electrolyte membrane described in an embodiment disclosed in this application includes: an extruder; a non-woven fabric manufacturing machine; and an all-solid-state battery laminate manufacturing machine, the extruder kneads a resin while melting it, the non-woven fabric manufacturing machine forms a non-woven fabric by making the resin fibrous, and the all-solid-state battery laminate manufacturing machine forms a solid electrolyte membrane by applying a slurry containing solid electrolyte particles onto the non-woven fabric and drying and pressurizing the slurry.

An apparatus for manufacturing an all-solid-state battery described in an embodiment disclosed in this application includes: an extruder; a non-woven fabric manufacturing machine; and an all-solid-state battery laminate manufacturing machine, the extruder kneads a resin while melting it, the non-woven fabric manufacturing machine forms a non-woven fabric by making the resin fibrous, and the all-solid-state battery laminate manufacturing machine (a) forms a solid electrolyte membrane by applying a slurry containing solid electrolyte particles onto the non-woven fabric and drying and pressurizing the slurry on the non-woven fabric and (b) forms a positive electrode member on one surface of the solid electrolyte membrane and forms a negative electrode member on the other surface of the solid electrolyte membrane.

Effects of the Invention

According to the method of manufacturing the solid electrolyte membrane described in the typical embodiment disclosed in this application, it is possible to efficiently manufacture the solid electrolyte membrane having favorable characteristics. According to the method of manufacturing the all-solid-state battery described in the typical embodiment disclosed in this application, it is possible to efficiently manufacture the all-solid-state battery having favorable characteristics. According to the apparatus for manufacturing the solid electrolyte membrane described in the typical embodiment disclosed in this application, it is possible to efficiently manufacture the solid electrolyte membrane having favorable characteristics. According to the apparatus for manufacturing the all-solid-state battery described in the typical embodiment disclosed in this application, it is possible to efficiently manufacture the all-solid-state battery having favorable characteristics.

BRIEF DESCRIPTIONS OF THE DRAWINGS

DETAILED DESCRIPTION OF PREFERRED EMBODIMENTS

First Embodiment

Hereinafter, an embodiment of the present invention will be described in detail with reference to drawings.

[Configuration of All-Solid-State Battery]

Figure 1:
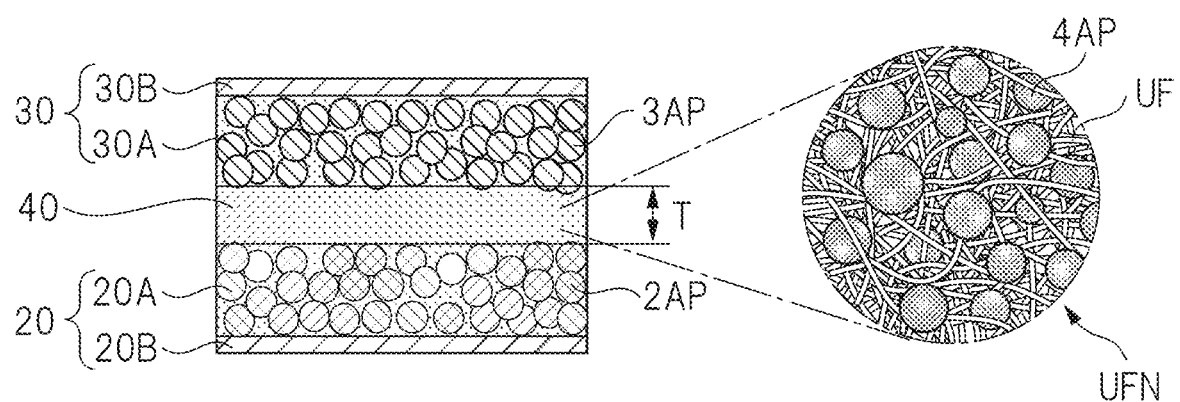
FIG. 1 is a cross-sectional view schematically showing a configuration of an all-solid-state battery according to an embodiment.

FIG. 1 is a cross-sectional view schematically showing a configuration of an all-solid-state battery according to an embodiment. This all-solid-state battery is a lithium ion secondary battery. In this specification, the all-solid-state battery means a battery that does not include at least an electrolytic solution (liquid electrolyte).

As shown in FIG. 1, the lithium ion secondary battery according to the present embodiment includes a negative electrode 20, a positive electrode 30, and a solid electrolyte membrane (solid electrolyte layer) 40 arranged therebetween.

The negative electrode 20 has a negative electrode mixture layer 20A and a negative electrode current collector 20B. The negative electrode mixture layer 20A has a negative electrode active material 2AP and a solid electrolyte material (solid electrolyte material for negative electrode). Further, the negative electrode mixture layer 20A may have a negative electrode conductive assistant, a negative electrode binder, and the like. The negative electrode current collector 20B is made of, for example, metal foil (for example, copper foil).

As the negative electrode active material 2AP, a material capable of occluding and releasing lithium, for example, graphite (natural graphite, artificial graphite, etc.) can be used. The negative electrode active material 2AP is granular.

The positive electrode 30 has a positive electrode mixture layer 30A and a positive electrode current collector 30B. The positive electrode mixture layer 30A has a positive electrode active material 3AP and a solid electrolyte material (solid electrolyte material for positive electrode). Further, the positive electrode mixture layer 30A may have a positive electrode conductive assistant, a positive electrode binder, and the like. The positive electrode current collector 30B is made of, for example, metal foil (for example, aluminum foil).

As the positive electrode active material 3AP, a material capable of occluding and releasing lithium, for example, an oxide containing lithium ($LiCoO_2$, $LiNiO_2$, $LiMnO_2$, etc.) can be used. The positive electrode active material 3AP is granular.

The solid electrolyte membrane 40 is made of a solid electrolyte material. As the solid electrolyte material, a material having Li ion conductivity can be used. The solid electrolyte material is granular.

As the solid electrolyte material, a sulfide-based solid electrolyte or an oxide-based solid electrolyte can be used.

As the sulfide-based solid electrolyte, for example, a sulfide containing Li and P can be used. Specifically, $Li_2S$—$SiS_2$, $Li_2S$—$P_2S_5$, $Li_2S$—$GeS_2$, $Li_2S$—$B_2S_3$, $Li_2S$—$Ga_2S_3$, $Li_2S$—$Al_{2S_3}$, $Li_2S$—$GeS_2$—$P_2S_5$, $Li_2S$—$A_{l_2S_3}$—$P_2S_5$, $Li_2S$—$P_2S_3$, $Li_2S$—$P_2S_3$—$P_2S_5$, $LiX$—$Li_2S$—$P_2S_5$, $LiX$—$Li_2S$—$SiS_2$, $LiX$—$Li_2S$—$B_2S_3$ (X: I, Br, Cl, or I), and the like can be presented.

As the oxide-based solid electrolyte, for example, an oxide containing Li can be used. Specifically, $La_{0.51}Li_{0.34}TiO_{2.94}$, $Li_{1.3}Al_{0.3}Ti_{1.7}(PO_4)_3$, $Li_7La_3Zr_2O_{12}$, $Li_{2.9}P_{0.3.3}N_{0.46}$, $Li_{3.6}Si_{0.6}P_{0.4}O_4$, $Li_{1.5}Al_{0.5}Ge_{1.5}(PO_4)_3$, and the like can be presented.

As the solid electrolyte, one type may be used alone, or two or more types may be used in combination as needed. Also, the solid electrolytes included in the positive electrode and the negative electrode may be of the same or different types.

Here, in the present embodiment, the solid electrolyte membrane 40 includes an ultrafine fiber non-woven fabric UFN and a solid electrolyte material (solid electrolyte particles 4AP). Specifically, the solid electrolyte particles 4AP are incorporated in the ultrafine fiber non-woven fabric UFN used as a support (see the circular portion in FIG. 1, FIG. 2, and FIG. 10(a)). In other words, the solid electrolyte particles 4AP are embedded in the fine pores of the ultrafine fiber non-woven fabric UFN, or the solid electrolyte particles 4AP are filled in the fine pores of the ultrafine fiber non-woven fabric UFN.

The ultrafine fiber non-woven fabric UFN can be formed by the laser electrospinning (LES) method as described later. The ultrafine fiber non-woven fabric UFN has a configuration in which ultrafine fibers UF are mutually entwined to be laminated. Also, there are fine pores (fine holes, fine through holes) between the ultrafine fibers UF. As described above, the ultrafine fiber non-woven fabric UFN is microporous. By using the ultrafine fibers UF having a small fiber diameter and high uniformity, the pore diameter becomes finer and the variation thereof becomes smaller.

Therefore, the characteristics of the solid electrolyte membrane 40 can be improved by using the configuration in which the solid electrolyte material (particles) is incorporated in the ultrafine fiber non-woven fabric UFN used as a support as described above. Specifically, by supporting (fixing) the solid electrolyte material, which is fine particles, with the ultrafine fiber UF, the ratio of the solid electrolyte material in the solid electrolyte membrane 40 can be increased, and the occupied area (exposed area) of the solid electrolyte material on the surface of the membrane can be increased. As a result, the contact area between the solid electrolyte membrane 40 and the positive and negative electrodes (positive and negative electrode active materials) can be improved, so that the characteristics (output characteristics, charge/discharge characteristics) of the all-solid-state battery can be improved. Also, by supporting (fixing) the solid electrolyte material, which is fine particles, with the ultrafine fiber UF, the film thickness of the solid electrolyte membrane 40 can be reduced, the resistance between the positive electrode and the negative electrode can be reduced, and the characteristics (output characteristics, charge/discharge characteristics) of the all-solid-state battery can be improved.

In addition, by supporting (fixing) the solid electrolyte material, which is fine particles, with the ultrafine fiber UF, the solid electrolyte material can be firmly fixed, and the solid electrolyte material can be prevented from falling off or collapsing. Further, it is also possible to increase the strength of the solid electrolyte membrane.

Next, the manufacturing process of the solid electrolyte membrane will be described, and the configuration of the solid electrolyte membrane will be described in more detail.

Method of Fabricating Solid Electrolyte Membrane

Method of Fabricating Ultrafine Fiber Non-Woven Fabric

In the laser electrospinning (LES) method, ultrafine fibers are fabricated by instantaneously and uniformly heating and melting a fibrous raw material (raw material resin) by irradiating a laser beam in a state of applying a high voltage (for example, about 11 to 24 kV) to a nozzle while sending out the fibrous raw material at a constant speed, and then stretching the material by electrostatic force. As the characteristics of the LES method, since the material is heated by the laser beam, the heating time is short and the thermal decomposition can be suppressed as much as possible. Also, since the material is stretched by electrostatic force, the application concentration is less likely to occur and the stable fiber spinning is possible.

Figure 5:
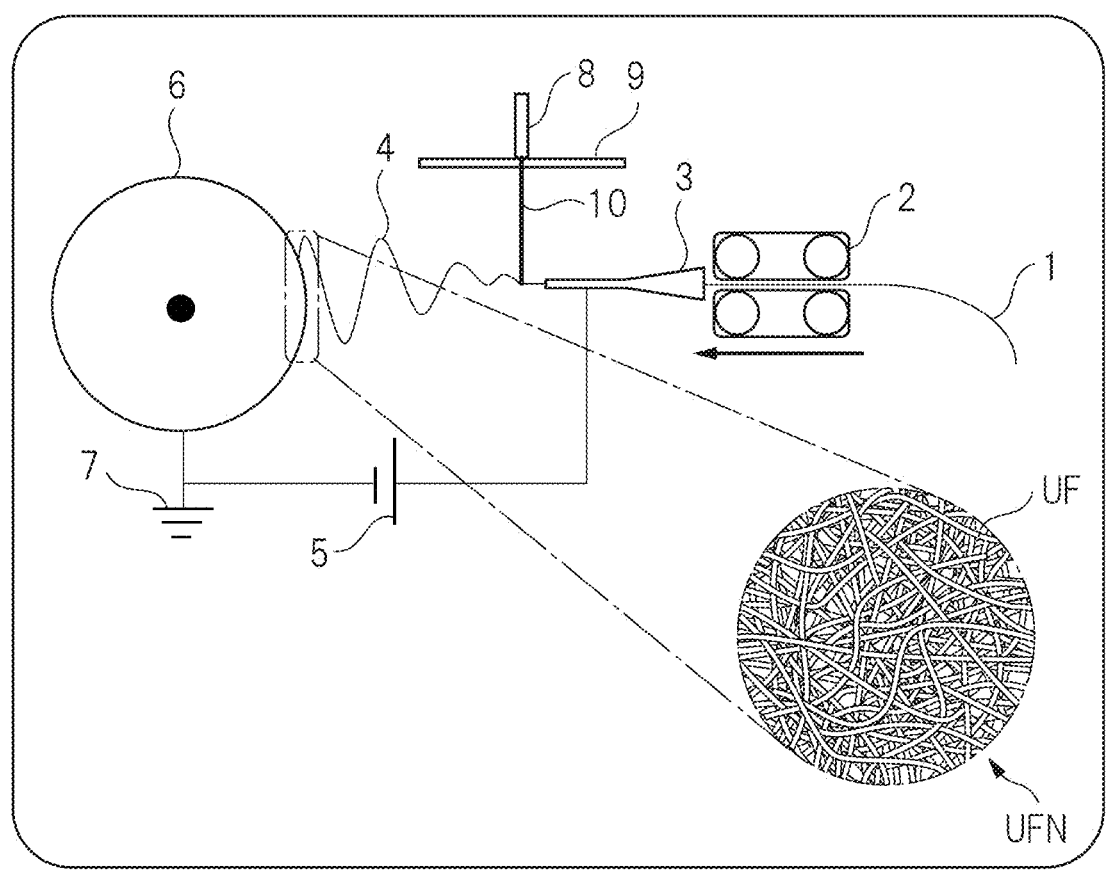
FIG. 5 is a schematic diagram showing a configuration of a laser electrospinning apparatus.

FIG. 5 is a schematic diagram showing a configuration of a laser electrospinning apparatus. As shown in FIG. 5, the laser electrospinning apparatus includes a nozzle 3 that sends out a raw material resin, a laser irradiation unit 8 that irradiates a tip of the nozzle 3 with a laser ($CO_2$ laser) 10, and a collector (fiber collecting unit) 6 that stretches the fibers discharged from the nozzle 3 by electrostatic force. A high voltage is applied between the collector 6 and the nozzle 3 by a high voltage generation source 5, and the collector 6 is connected to a ground potential 7. The laser irradiation unit 8 irradiates the tip of the nozzle 3 with the laser 10 through a slit 9. A thread-like resin (raw material resin) 1 as a raw material is supplied to the nozzle 3 through a roller 2.

When the raw material resin 1 extruded from the nozzle 3 is irradiated with the laser 10 in the state of applying a high voltage between the nozzle 3 and the collector 6 by the high voltage generation source 5, the raw material resin 1 is instantaneously and uniformly heated and melted, stretched by electrostatic force to become the ultrafine fiber UF, and collected on the collector 6. The non-woven fabric (fiber web) UFN can be obtained by laminating the ultrafine fibers UF while being entwined with each other.

As the raw material resin, a thermoplastic resin can be used. For example, a thermoplastic resin which has a softening temperature of 100° C. or higher and is insoluble in an organic solvent (for example, xylene) at 20° C. can be used. The softening temperature is a temperature at which the thermoplastic material starts to soften rapidly, and can be measured by a method based on "Thermoplastic materials—Determination of Vicat softening temperature (VST)" (JIS K 7206). Specific examples of the raw material resin include polyolefins such as polyethylene, high-density polyethylene, polypropylene, and polymethylpentene, polyesters such as polyethylene terephthalate (PET) and polybutylene terephthalate (PBT), polyvinylidene fluoride (PVDF), polyamide, and polyphenylene sulfide. It is preferable to use polyethylene, high-density polyethylene, or polypropylene as the raw material resin. In particular, by using high-density polyethylene (HDPE), the ultrafine fiber non-woven fabric having high strength and high heat resistance can be formed. Further, although polypropylene tends to have a slightly slower crystallization rate than polyethylene, polypropylene can be preferably used as a raw material resin because crystallization is promoted by the function of the nucleating agent of cellulose nanofiber (CeNF) described later.

Here, in the present embodiment, cellulose nanofiber (CeNF) is added to the raw material resin. By adding CeNF, the ultrafine fibers become finer and more uniform. It is conceivable that this is because the addition of CeNF to the raw material resin increases the stretching effect by the electrostatic force and promotes the fibers to be ultrafine. The fiber diameter (average fiber diameter) of the ultrafine fiber to which CeNF is added is 10 μm or less, preferably 5 μm or less, and more preferably 1 μm or less. The amount of CeNF added to the raw material resin is, for example, 0.1 vol % or more and 10 vol % or less. On the other hand, the fiber diameter (average fiber diameter) of the fiber to which CeNF is not added is about a dozen μm.

CeNF is fine powdered cellulose. Cellulose (Cell-OH) is a carbohydrate represented by $(C_6H_{10}O_5)_n$. CeNF is made from pulp or the like as a raw material and is obtained by micronizing the cellulose fibers contained in the pulp or the like to a nanometer size. For example, the product obtained by hydrolyzing pulp can be used as cellulose nanofiber. The portion where the molecular chains of cellulose are densely and regularly present is sometimes referred to as crystalline cellulose.

The shape of the powdered cellulose fiber constituting the cellulose nanofiber is not limited, and for example, the powdered cellulose fiber having an elongated particle shape or a substantially spherical shape can be used.

Cellulose nanofiber is lightweight, has high strength, and has heat resistance. Therefore, by adding it to the raw material resin, the strength and heat resistance of the ultrafine fiber and the ultrafine fiber non-woven fabric can be improved.

Cellulose may be nano-sized by a defibering treatment (micronizing treatment). The defibering treatment includes a chemical treatment method and a mechanical treatment method. These methods may be used in combination. By such a defibering treatment (micronizing treatment), the fiber length and the fiber diameter can be reduced.

The cellulose nanofiber (CeNF) to be added to the raw material resin preferably has a fiber length (L) of 0.5 μm or more and 10 μm or less and a fiber diameter (R) of 0.001 μm or more and 10 μm or less. Also, it is preferable that the fiber length (L) and the fiber diameter (R) are smaller than at least the ultrafine fiber diameter R.

By adding the cellulose nanofiber (CeNF) described above to the raw material resin, the ultrafine fiber to be formed becomes finer and more uniform. It is conceivable that this is because the hydroxyl group (—OH) of cellulose is a polar group, so that the fiber is easily attracted by the electrostatic force of the collector 6 and becomes finer and more uniform, that is, the stretching effect is increased.

As described above, by adding a polar filler (filler having a polar group) such as CeNF to the raw material resin, the fiber diameter of the ultrafine fiber obtained by the LES method can be made finer and more uniform. Further, the pore diameter of the ultrafine fiber non-woven fabric obtained by the LES method can be made finer and more uniform.

In the above description, cellulose nanofiber (CeNF) has been described as an example, but cellulose nanocrystal and cellulose nanowhisker may be used. Cellulose nanofiber, cellulose nanocrystal, and cellulose nanowhisker are referred to as nanocellulose.

Figure 2:
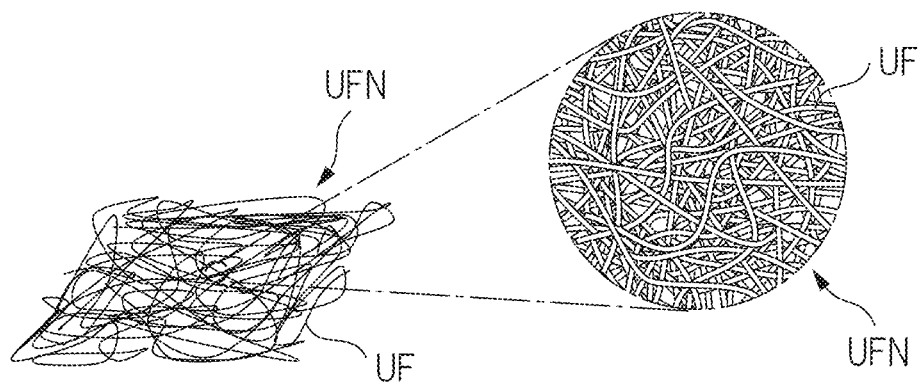
FIG. 2 is a diagram showing a manufacturing process of a solid electrolyte membrane according to the embodiment.
Figure 2:
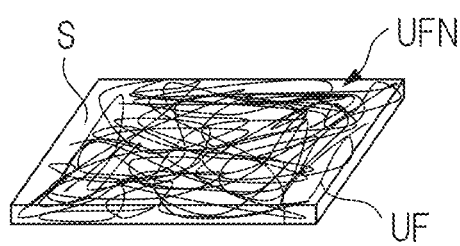
Figure 2:
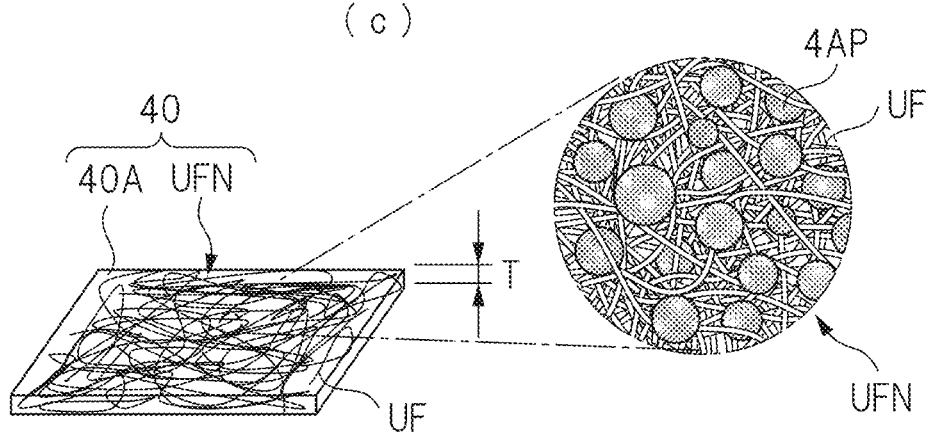

Method of Fabricating Solid Electrolyte Membrane Using Ultrafine Fiber Non-Woven Fabric FIG. 2 is a diagram showing a manufacturing process of a solid electrolyte membrane according to the present embodiment. A solid electrolyte membrane is formed using the ultrafine fiber non-woven fabric obtained by the above-described <Method of fabricating ultrafine fiber non-woven fabric>.

First, the ultrafine fiber non-woven fabric UFN shown in FIG. 2(*a*) and the slurry S containing the solid electrolyte material (solid electrolyte particles 4AP) are prepared. The slurry S is obtained by dispersing a solid electrolyte material in a liquid (solvent, dispersion medium). If necessary, a binder or the like may be added. Next, as shown in FIG. 2(*b*), the slurry S containing the solid electrolyte material is applied onto the ultrafine fiber non-woven fabric UFN. Next, as shown in FIG. 2(*c*), by heating the slurry S while pressurizing it, the liquid component of the slurry S is vaporized and the solid electrolyte material (solid electrolyte particles 4AP) is embedded (filled) into the fine pores of the ultrafine fiber non-woven fabric. In this way, it is possible to form the solid electrolyte membrane 40 in which the solid electrolyte material (solid electrolyte particles 4AP) is incorporated in the fine pores of the ultrafine fiber non-woven fabric UFN in which the ultrafine fibers UF are mutually entwined to be laminated (FIG. 2(*c*)). As described above, the solid electrolyte membrane 40 can be formed by a simple process and at low cost. Note that the solid electrolyte material after the liquid component has been removed is denoted by "40A". Further, the process of removing the liquid component of the slurry S (drying process) and the process of pressurizing the solid electrolyte material (solid electrolyte particles 4AP) may be separately performed.

Figure 3:
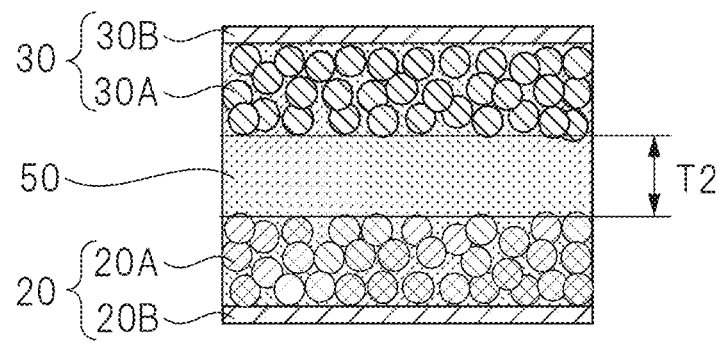
FIG. 3 is a cross-sectional view schematically showing a configuration of an all-solid-state battery according to a comparative example.
Figure 4:
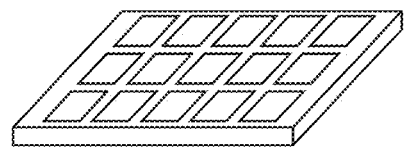
FIG. 4 is a diagram showing a manufacturing process of a solid electrolyte sheet of the all-solid-state battery according to the comparative example.
Figure 4:
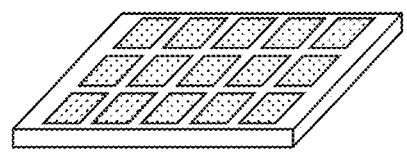
Figure 4:
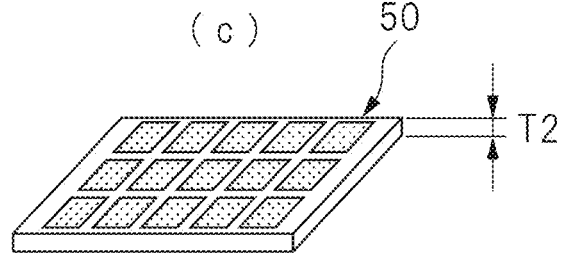

FIG. 3 is a cross-sectional view schematically showing a configuration of an all-solid-state battery according to a comparative example. Also, FIG. 4 is a diagram showing a manufacturing process of a solid electrolyte sheet of the all-solid-state battery according to the comparative example. For example, in the comparative example shown in FIG. 3 and FIG. 4, a solid electrolyte sheet (thickness: 37 to 138 μm) is fabricated by filling a solid electrolyte into a polyimide sheet-like support (FIG. 4(a)) in which a plurality of through holes having a square shape with a side of 200 to 800 μm processed by a photoetching method is formed (FIG. 4(b)), and then heating and pressurizing the support with a press machine (FIG. 4(c)).

In the case of the comparative example described above, each hole has a square shape with a side of 200 to 800 μm, and there is a limitation in the opening ratio. Namely, when the opening ratio is increased, the contact area between the solid electrolyte and the positive and negative electrodes can be increased, but there is a concern that the solid electrolyte material may fall off or collapse. Further, the thickness of the sheet (T2) is as large as 37 to 138 μm. On the other hand, in the present embodiment, the film thickness (T) of the solid electrolyte membrane 40 can be easily adjusted, and the film thickness can be set to, for example, 20 μm or less. In the LES method, the characteristics (thickness, fiber diameter, pore diameter, etc.) of the ultrafine fiber non-woven fabric can be easily adjusted by adjusting the processing conditions (applied voltage, distance between the nozzle and the laser irradiation unit, processing time, etc.). In particular, the volume ratio of the non-woven fabric serving as the support to the solid electrolyte membrane can be suppressed, and can be set to, for example, 10 vol % or more and 30 vol % or less.

As described above, in the present embodiment, the characteristics of the solid electrolyte membrane can be improved.

EXAMPLE

Example 1

In this example, a fiber web (also referred to as non-woven fabric, fiber bundle, or fiber sheet) of HDPE was fabricated by the laser electrospinning (LES) method. As the LES apparatus, an electrospinning (ES) apparatus manufactured by Kato Tech Co., Ltd. and a carbon dioxide laser generator (PIN-30R) manufactured by Onizuka Glass Co., Ltd were used in combination. As the needle for sending out the fiber, a needle of 20G standard was used, and this was used as the nozzle. The LES apparatus was covered with an enclosure box made of acrylic resin, and the atmosphere inside the enclosure box was maintained at a humidity of 10 to 30% RH by supplying dry air. In this way, it was possible to eliminate the influence of humidity during fiber formation.

The wavelength of the $CO_2$ laser beam was 10.6 μm, and the laser beam horizontally emitted from the apparatus was reflected by a mirror and the raw material resin directly below the mirror was irradiated with the laser beam. The cross-section of the laser beam at the time of emission was circular with a fiber diameter of 6 mm, and it was converted by a beam shape conversion element (expander) so as to have 2.1 mm in a fiber axis direction and 13 mm in a direction horizontal to the fiber axis at the irradiation portion. Also, the irradiation diameter of the laser beam was set to about 1.1 mm in the fiber axis direction and about 8.0 mm in the vertical direction by using a slit.

The diameter of the raw material resin (fibrous) was about 0.5 mm, the distance between the nozzle and the collector was 80 mm, the distance from the nozzle to the central axis of the laser beam was 0.7 mm, and the sending speed was 40 mm/min. A roller (no rotation, traverse speed: 2 mm/sec) was used as a fiber collector (collection plate), and the fiber web of HDPE was fabricated by changing the laser output to 11 to 16 W and changing the applied voltage to 11 to 24 kV.

Figure 6:
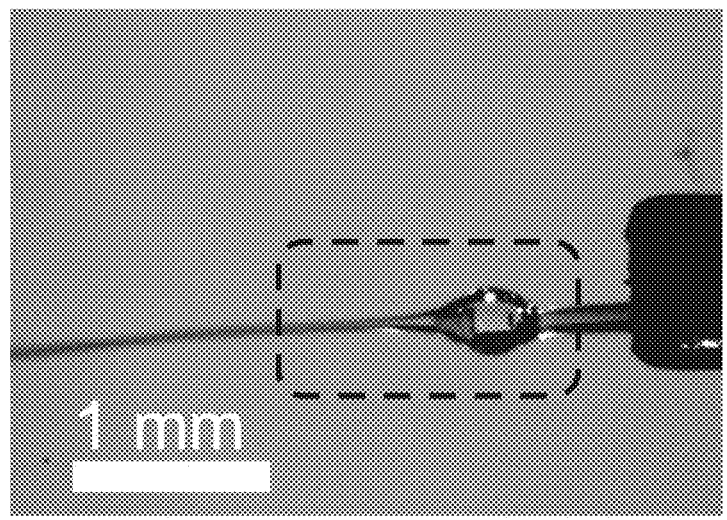
FIG. 6 is a diagram (photograph) showing a state of a nozzle tip at the time of forming a fiber web of HDPE.
Figure 7:
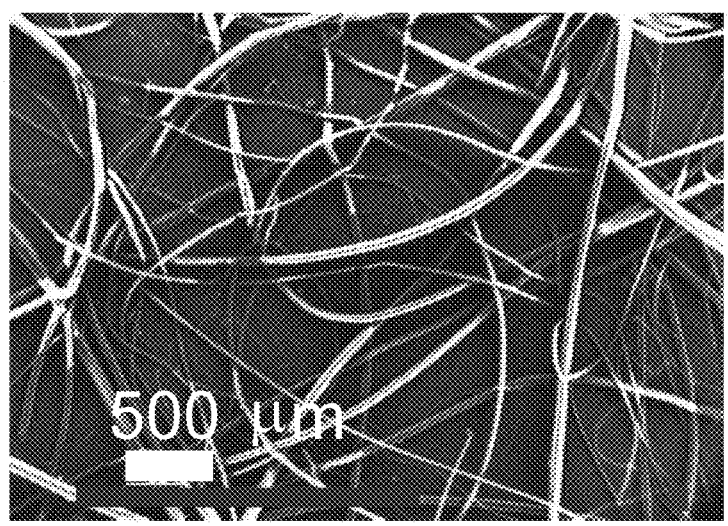
FIG. 7 is a SEM photograph of the fiber web of HDPE.

FIG. 6 is a diagram (photograph) showing a state of a nozzle tip at the time of forming the fiber web of HDPE. FIG. 7 is a SEM photograph of the fiber web of HDPE. Morphological observation was performed using SEM (KYENCE, VE-7800). Prior to the observation, gold evaporation was performed by ion sputter (E-1010 manufactured by Hitachi, Ltd.) so as to enable the SEM observation. In the observation, the distance between two points in the fiber diameter direction was defined as one point for each fiber in the obtained SEM image, and the fiber diameter was obtained by measuring a total of 100 points by using the image analysis software ImageJ. The fiber diameter was a dozen μm or more.

Example 2

In this example, a fiber web of CeNF-added HDPE was fabricated by the laser electrospinning (LES) method. HDPE added with CeNF was used as a raw material resin, and the fiber web was fabricated in the same manner as in Example 1. The amount of CeNF added to HDPE was 1 vol % (CeNF: 1 vol %, HDPE: 99 vol %), and CEOLUS FD101 (manufactured by Asahi Kasei Chemicals Co., Ltd.) was used as CeNF.

Figure 8:
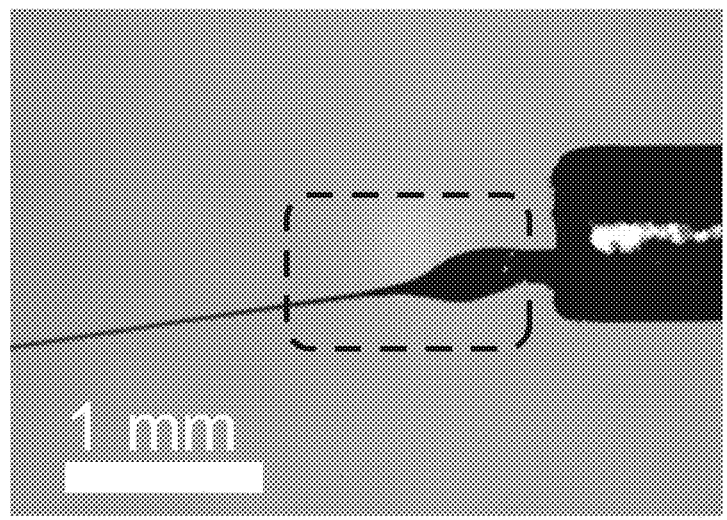
FIG. 8 is a diagram (photograph) showing a state of a nozzle tip at the time of forming a fiber web of CeNF-added HDPE.
Figure 9:
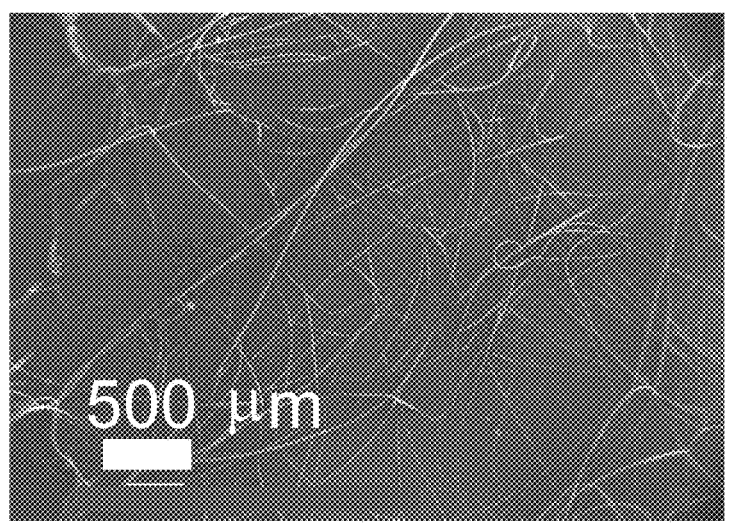
FIG. 9 is a SEM photograph of the fiber web of CeNF-added HDPE.

FIG. 8 is a diagram (photograph) showing a state of a nozzle tip at the time of forming the fiber web of CeNF-added HDPE. FIG. 9 is a SEM photograph of the fiber web of CeNF-added HDPE. The fiber diameter of the fiber web of CeNF-added HDPE was 5 μm or less (about 4 μm).

In this example, as compared with the case of Example 1 in which CeNF was not added, the fiber could be smoothly stretched, the fiber spinning was stable, the fiber diameter was reduced, and the fiber web with uniform thickness was obtained.

[Method of Fabricating All-Solid-State Battery]

Figure 10:
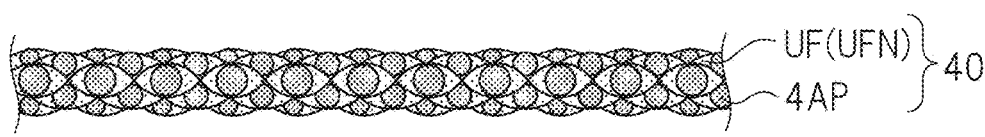
FIG. 10 is a cross-sectional view showing a manufacturing process of an all-solid-state battery.
Figure 10:
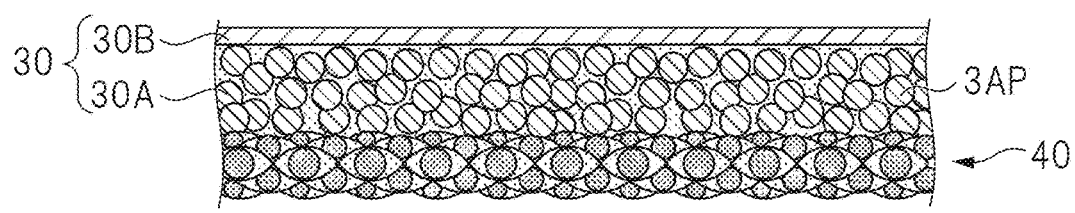
Figure 10:
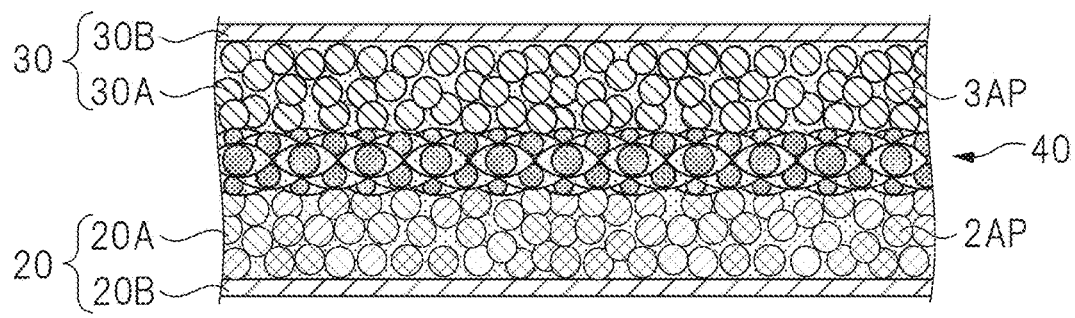

The method of fabricating the all-solid-state battery described with reference to FIG. 1 is not limited, and for example, the all-solid-state battery can be manufactured as follows. FIG. 10 is a cross-sectional view showing a manufacturing process of an all-solid-state battery.

The solid electrolyte membrane 40 in which the solid electrolyte particles 4AP are incorporated between the ultrafine fibers UF (FIG. 10(a)) is formed based on the above-mentioned [Method of fabricating solid electrolyte membrane].

Next, a mixture of the positive electrode active material 3AP and the solid electrolyte material is mounted on the upper surface side (positive electrode side) of the solid electrolyte membrane 40, the positive electrode current collector 30B is mounted thereon, and then, they are pressurized (pressed). In this way, the positive electrode (positive electrode mixture layer 30A and positive electrode current collector 30B) is formed on the upper surface of the solid electrolyte membrane 40 (FIG. 10(b)).

Next, with the lower surface side (negative electrode side) of the solid electrolyte membrane 40 facing upward, a mixture of the negative electrode active material 2AP and the solid electrolyte material is mounted, the negative electrode current collector 20B is mounted thereon, and then, they are pressurized (pressed). In this way, the negative electrode (negative electrode mixture layer 20A and negative electrode current collector 20B) is formed on the lower surface side (negative electrode side) of the solid electrolyte membrane 40 (FIG. 10(c)).

Consequently, an electrode group composed of the positive electrode current collector 30B, the positive electrode mixture layer 30A, the solid electrolyte membrane 40, the negative electrode mixture layer 20A, and the negative electrode current collector 20B is formed.

Thereafter, for example, the all-solid-state battery can be formed by inserting the electrode group into the battery case and sealing the battery case.

Note that the pressurizing process may be performed at once after the positive electrode active material 3AP and the like, the solid electrolyte membrane 40, the negative electrode active material 2AP and the like, and the negative electrode current collector 20B are sequentially stacked on the positive electrode current collector 30B.

Operation of All-Solid-State Battery

In the above-mentioned all-solid-state battery, lithium ions are desorbed from the positive electrode active material 3AP of the positive electrode mixture layer 30A during the charging process, and lithium ions desorbed from the negative electrode active material 2AP of the negative electrode mixture layer 20A are inserted during the discharging process. In this way, charging and discharging can be performed by inserting and desorbing lithium ions.

As described above, by manufacturing an all-solid-state battery using the solid electrolyte membrane 40 in which the solid electrolyte material (particles) is incorporated in the ultrafine fiber non-woven fabric UFN used as a support, it is possible to manufacture an all-solid-state battery having favorable characteristics. Specifically, as described above, by supporting (fixing) the solid electrolyte material, which is fine particles, with the ultrafine fiber UF, the ratio of the solid electrolyte material in the solid electrolyte membrane 40 can be increased, and the occupied area (exposed area) of the solid electrolyte material on the surface of the membrane can be increased. As a result, the contact area between the solid electrolyte membrane 40 and the positive and negative electrodes (positive and negative electrode active materials) can be improved, and the characteristics (output characteristics, charge/discharge characteristics) of the all-solid-state battery can be improved. Further, by supporting (fixing) the solid electrolyte material, which is fine particles, with the ultrafine fiber UF, the film thickness of the solid electrolyte membrane 40 can be reduced and the resistance between the positive electrode and the negative electrode can be reduced, so that the characteristics (output characteristics, charge/discharge characteristics) of the all-solid-state battery can be improved.

Second Embodiment

In the present embodiment, a manufacturing apparatus (manufacturing system) suitable for use in a method of manufacturing an all-solid-state battery will be described.

Figure 11:
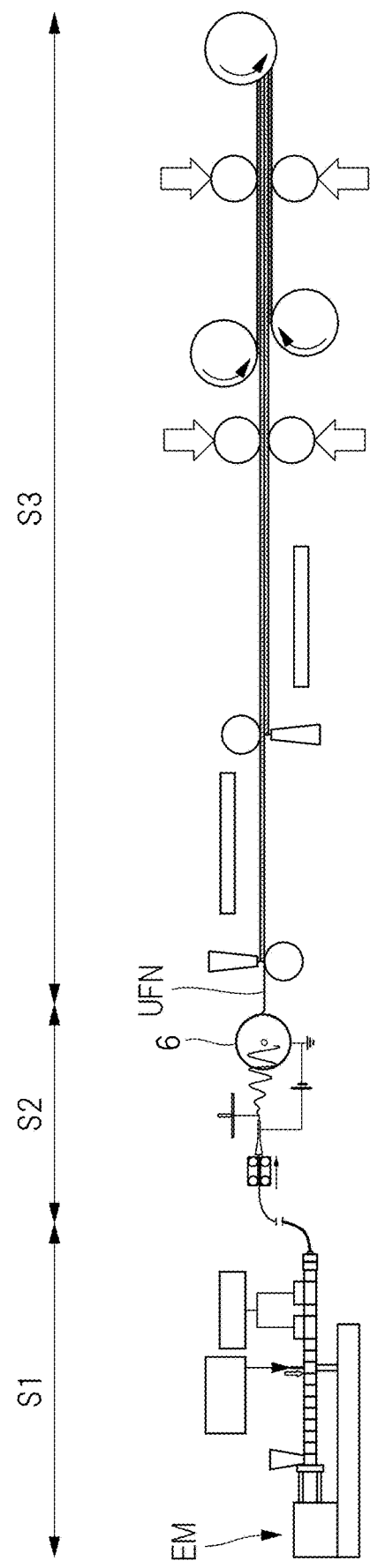
FIG. 11 is a schematic diagram showing a configuration of a manufacturing apparatus (system) according to the second embodiment.
Figure 12:
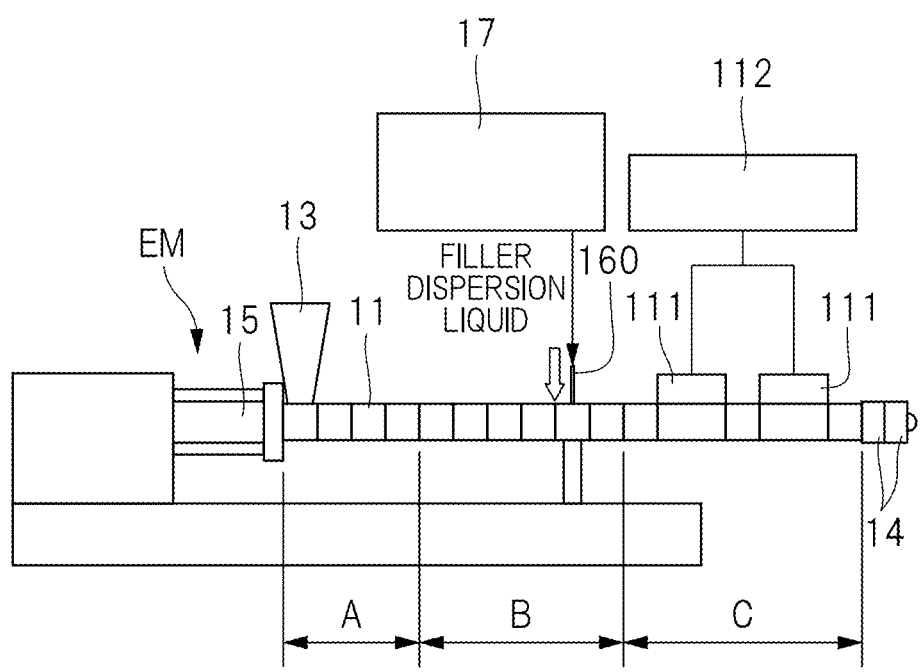
FIG. 12 is a diagram showing a configuration of a twin-screw kneading extruder.
Figure 13:
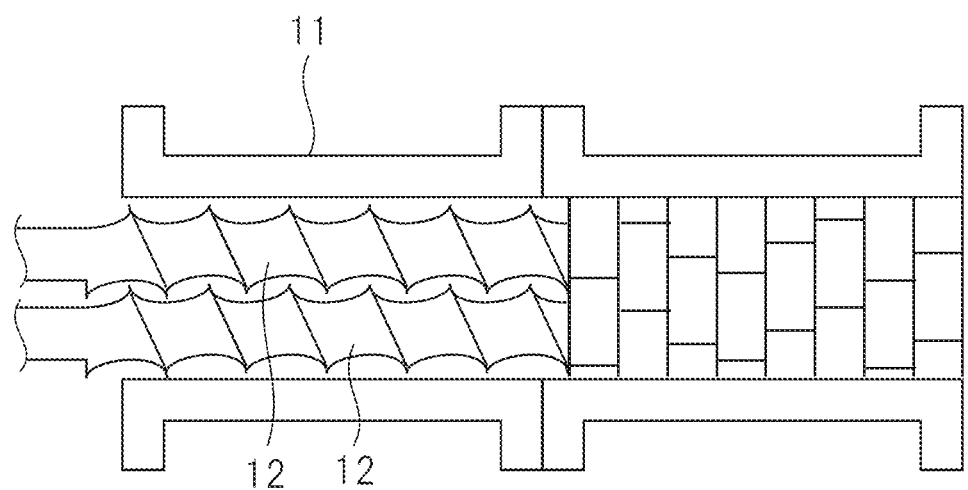
FIG. 13 is a diagram showing a configuration of a part of the extruder.
Figure 14:
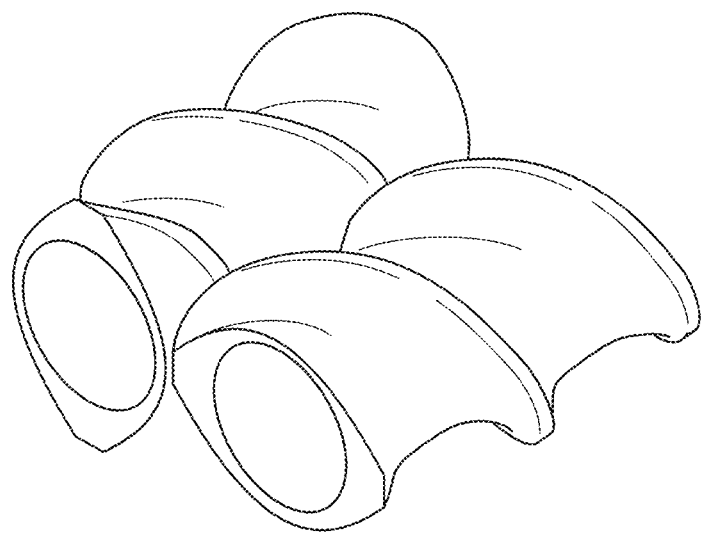
FIG. 14 is a diagram showing a configuration of a screw.
Figure 14:
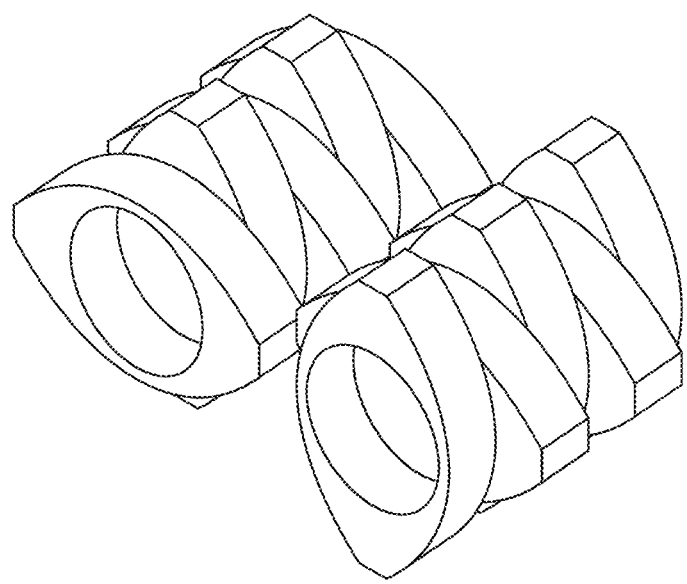
Figure 15:
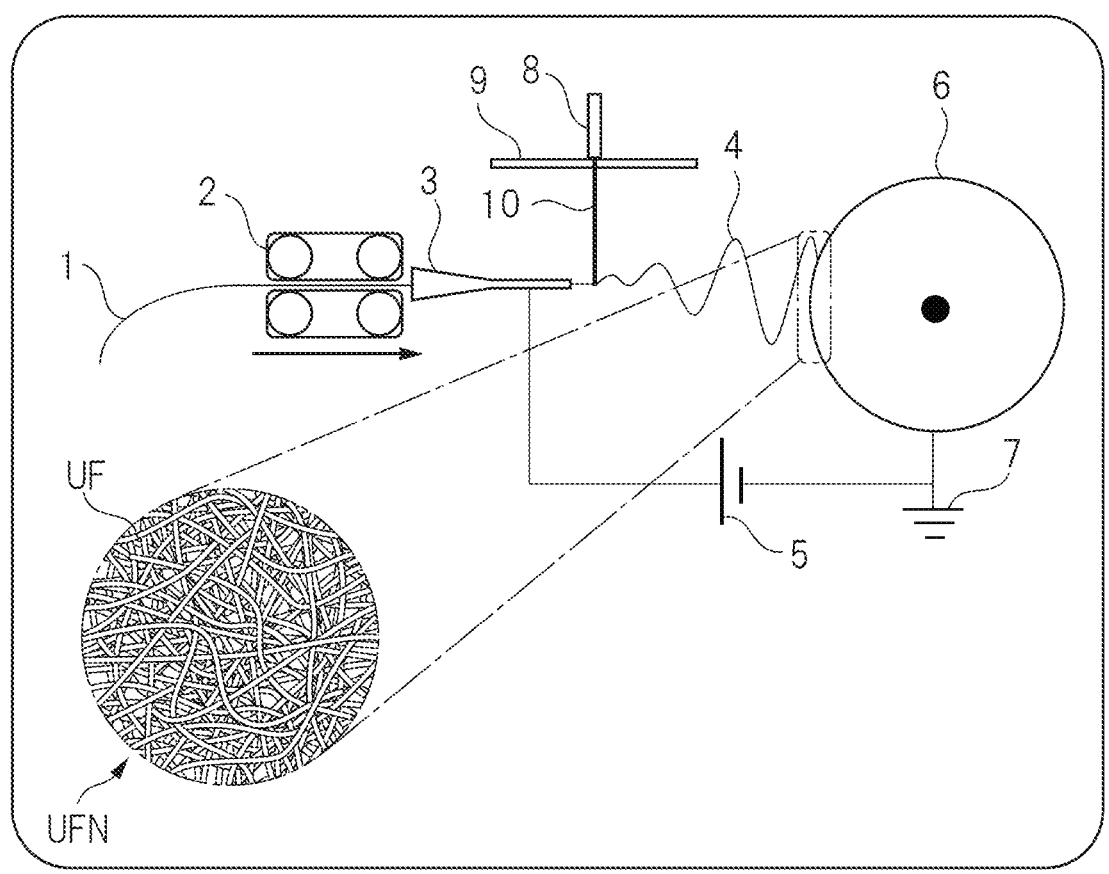
FIG. 15 is a diagram showing a configuration of a non-woven fabric manufacturing machine.
Figure 16:
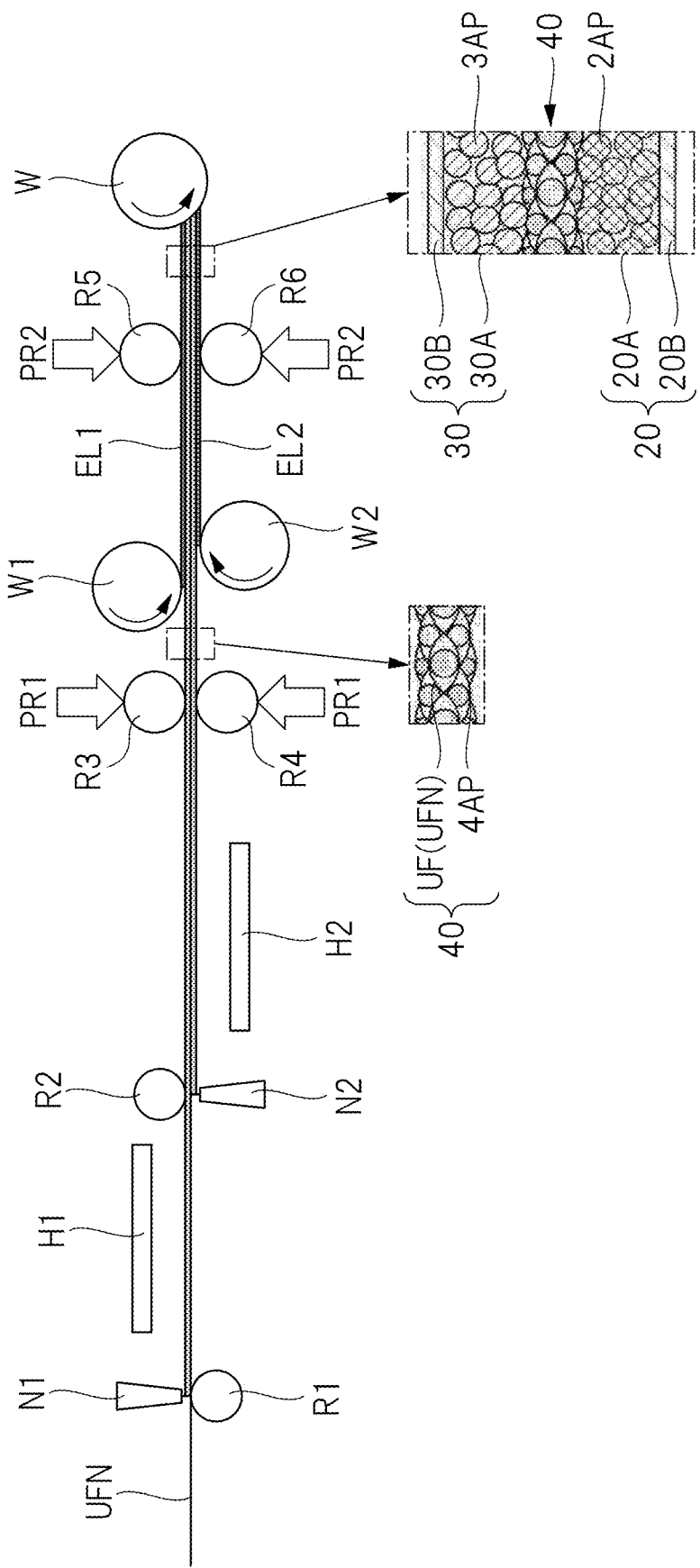
FIG. 16 is a diagram showing a configuration of an all-solid-state battery laminate manufacturing machine.

FIG. 11 is a schematic diagram showing a configuration of a manufacturing apparatus (system) according to the present embodiment. FIG. 12 is a diagram showing a configuration of a twin-screw kneading extruder, FIG. 13 is a diagram showing a configuration of a part of the extruder, and FIG. 14 is a diagram showing a configuration of a screw. Also, FIG. 15 is a diagram showing a configuration of a non-woven fabric manufacturing machine and FIG. 16 is a diagram showing a configuration of an all-solid-state battery laminate manufacturing machine.

As shown in FIG. 11, S1 indicates a processing section by a twin-screw kneading extruder, S2 indicates a processing section by a non-woven fabric manufacturing machine, and S3 indicates a processing section by an all-solid-state battery laminate manufacturing machine.

The twin-screw kneading extruder EM is an apparatus that melts and kneads the input raw material with two shafts having screws that mesh with each other (see FIG. 12 to FIG. 14) and extrudes it. Here, CeNF is kneaded with the molten resin.

As the resin, for example, a thermoplastic resin can be used. For example, polyethylene, polyvinylidene fluoride (PVDF), polymethylpentene, polyethylene terephthalate (PET), polybutylene terephthalate (PBT), and the like can be used. These resins may be used alone or as a mixture of a plurality of these resins. As the polymer constituting the resin, those having a molecular weight of 1000 or more and 100,000 or less can be used. In particular, by using high-density polyethylene (HDPE) as the raw material resin, it is possible to form an ultrafine fiber non-woven fabric having high strength and high heat resistance. The fiber diameter of the ultrafine fiber constituting the ultrafine fiber non-woven fabric is, for example, about 5 to 35 μm.

CeNF can be added as a CeNF dispersion liquid. As the CeNF, the one described in the first embodiment can be used. Further, the CeNF subjected to surface treatment may also be used. By performing the surface treatment in this way, the defibration properties of CeNF are improved and the affinity with the resin is also improved. As the dispersion medium (solvent), a material which is liquid at room temperature, for example, water, an organic solvent such as ethanol or toluene, and oil such as liquid paraffin or process oil is preferable. These dispersion media may be used alone or as a mixture of a plurality of these media.

It is not preferable that the concentration of the filler dispersion liquid is too high because it will be difficult to send the liquid by a pump or the like that conveys the liquid to the apparatus in which the liquid is kneaded with the resin, and it is also not preferable that the concentration of the filler dispersion liquid is too low because the ratio of the dispersion media becomes high and a step of removing it from the resin becomes necessary. Therefore, the concentration of the filler dispersion liquid is preferably 5 to 80 wt %, more preferably 10 to 60 wt %.

As the kneading apparatus for the thermoplastic resin and the filler dispersion liquid, a single-screw extruder, a twin-screw extruder, a multi-screw extruder, or the like can be used. By using such an extruder, the materials can be continuously and rapidly mixed to uniformly disperse CeNF.

The injection location of the CeNF dispersion liquid is preferably on the downstream side of the plasticizing region of the resin, and the CeNF dispersion liquid is injected in the state where the molten resin is filled on the upstream side of the injection point. The injection device (for example, the injection nozzle) may be provided at one place, but may be provided at a plurality of places in order to improve the dispersion.

The amount of the filler added to the resin is preferably 0.1 vol % to 40 vol %, more preferably 0.1 vol % to 10 vol %, still more preferably 1 vol % to 10 vol %. As an index showing the function of the filler, the addition ratio is shown by vol % here.

As shown in FIG. 12, the extruder EM includes a cylinder 11 whose temperature is controlled by temperature control means (not shown), a screw (12) arranged in the cylinder 11 so as to be rotatable (freely rotatable) by a rotation drive mechanism 15, a hopper (input port) 13 provided on the upstream side of the cylinder 11, and a die 14 provided on the downstream end of the cylinder 11, and has a plasticization zone (plasticization part) A, a kneading zone (kneading part) B, and a devolatilization zone (deaeration part) C provided sequentially from the side of the hopper 13 to the side of the die 14. Also, an injection nozzle 160 for injecting the filler dispersion liquid is provided in a portion of the cylinder 11 corresponding to the kneading zone B, and a forced exhaust port 111 connected to a vacuum pump (deaeration device) 112 is provided in a portion of the cylinder 11 corresponding to the devolatilization zone C. A plunger pump (liquid addition pump) 17 is connected to the injection nozzle 160.

As shown in FIG. 13, two screws (a plurality of screws mounted on shafts) are rotatably inserted and incorporated in the cylinder 11. The two screws are arranged and rotated so as to mesh with each other. By passing the two screws in the vicinity of each other's screw surfaces in this way, the retention of the resin and the filler in the vicinity of the screw surface can be suppressed by the self-cleaning effect. The screw has a plurality of screw pieces. FIG. 14 is a perspective view showing an example of a shape of the screw (screw piece). FIG. 14(*a*) is a full flight screw and FIG. 14(*b*) is a kneading disc. The configuration shown in FIG. 13 is an example, and the combination of screw pieces can be changed as appropriate.

The thermoplastic resin supplied from the hopper 13 is melted in the plasticization zone A in the extruder EM and transferred to the kneading zone B. Then, after the filler dispersion liquid is injected into the molten resin from the injection nozzle 160, the molten resin and the filler dispersion liquid are mixed and kneaded, and then transferred to the devolatilization zone C. In the devolatilization zone C, the gasified dispersion medium is removed (exhausted) from the forced exhaust port 111, and the resin is extruded as a strand from the die 14.

FIG. 15 is a schematic diagram showing the configuration of a laser electrospinning apparatus. As described above, the laser electrospinning apparatus includes the nozzle 3 that sends out the raw material resin, the laser irradiation unit 8 that irradiates the tip of the nozzle 3 with the laser ($CO_2$ laser) 10, and the collector (fiber collecting unit) 6 that stretches the fibers discharged from the nozzle 3 by electrostatic force. A high voltage is applied between the collector 6 and the nozzle 3 by the high voltage generation source 5, and the collector 6 is connected to the ground potential 7. The laser irradiation unit 8 irradiates the tip of the nozzle 3 with the laser 10 through the slit 9. The thread-like resin (raw material resin) 1 as a raw material is supplied to the nozzle 3 through the roller 2.

When the raw material resin 1 extruded from the nozzle 3 is irradiated with the laser 10 in the state of applying a high voltage between the nozzle 3 and the collector 6 by the high voltage generation source 5, the raw material resin 1 is instantaneously and uniformly heated and melted, stretched by electrostatic force to become the ultrafine fiber UF, and collected on the collector 6. The non-woven fabric (fiber web) UFN can be obtained by laminating the ultrafine fibers UF while being entwined with each other.

By adding the cellulose nanofiber (CeNF) described above to the resin, the ultrafine fiber to be formed becomes finer and more uniform. It is conceivable that this is because the hydroxyl group (—OH) of cellulose is a polar group, so that the fiber is easily attracted by the electrostatic force of the collector 6 and becomes finer and more uniform, that is, the stretching effect is increased.

As described above, by adding a polar filler (filler having a polar group) such as CeNF to the raw material resin, the fiber diameter of the ultrafine fiber obtained by the LES method can be made finer and more uniform. Further, the pore diameter of the ultrafine fiber non-woven fabric obtained by the LES method can be made finer and more uniform.

FIG. 16 is a schematic diagram showing a configuration of an all-solid-state battery laminate manufacturing machine. The all-solid-state battery laminate manufacturing machine includes rollers R1 and R2 that convey the non-woven fabric (fiber web) UFN manufactured by the laser electrospinning apparatus, nozzles N1 and N2 that apply the slurry onto the non-woven fabric (fiber web) UFN, and heaters H1 and H2 for drying the applied film (coated film). Also, it further includes a press PR1 (rollers R3 and R4) that pressurizes the applied film, a feeder W1 that sends out the positive electrode member onto one surface of the applied film, a feeder W2 that sends out the negative electrode member onto the other surface of the applied film, a press PR2 that pressurizes a laminated body of the applied film, the positive electrode member EL1, and the negative electrode member EL2, and a winding machine W that winds the laminated body after pressurization.

Namely, the slurry containing the solid electrolyte material (solid electrolyte particles 4AP) is discharged from the nozzle N1 onto the surface of the non-woven fabric (fiber web) UFN. For example, the slurry is discharged onto the non-woven fabric (fiber web) UFN from the slit-shaped nozzle hole. The discharged slurry is heated (dried) by the heater H1 to become an applied film. Next, the slurry containing the solid electrolyte material (solid electrolyte particles 4AP) is discharged from the nozzle N2 onto the back surface of the non-woven fabric (fiber web) UFN. For example, the slurry is discharged from the slit-shaped nozzle hole to the back surface of the non-woven fabric (fiber web) UFN. The discharged slurry is heated (dried) by the heater H2 to become an applied film.

Also, the applied films on both surfaces of the non-woven fabric (fiber web) UFN are pressurized by the press PR1 composed of the rollers R3 and R4. In this way, the liquid component of the slurry is vaporized and the solid electrolyte material (solid electrolyte particles 4AP) is embedded (filled) in the fine pores of the ultrafine fiber non-woven fabric UFN, so that the solid electrolyte membrane 40 in which the solid electrolyte material (solid electrolyte particles 4AP) is incorporated in the fine pores of the ultrafine fiber non-woven fabric UFN in which the ultrafine fibers UF are entwined to be laminated can be formed (see also FIG. 2(*c*)).

Next, the positive electrode member EL1 is laminated on the surface of the solid electrolyte membrane 40 from the feeder W1, and the negative electrode member EL2 is laminated on the back surface of the solid electrolyte membrane 40 from the feeder W2. The positive electrode member EL1 is composed of, for example, the positive electrode 30 having the positive electrode mixture layer 30A and the positive electrode current collector 30B, and the negative electrode member EL2 is composed of, for example, the negative electrode 20 having the negative electrode mixture layer 20A and the negative electrode current collector 20B. The feeders W1 and W2 send out each member such that the mixture layers are in contact with the solid electrolyte membrane 40. As described above, the mixture layer contains an active material and a solid electrolyte material, which enables the conduction of Li ions.

Next, the laminated body of the positive electrode member ELI, the solid electrolyte membrane 40, and the negative electrode member EL2 is pressurized by the press PR2, and the pressurized laminated body is wound around the winding machine W.

As described above, in the present embodiment, the solid electrolyte membrane 40 and the laminated body of the positive electrode member EL1, the solid electrolyte membrane 40, and the negative electrode member EL2 can be efficiently manufactured.

Third Embodiment

In the present embodiment, various application examples of the above-described first and second embodiments will be described.

Application Example 1

In the first embodiment, the slurry containing the solid electrolyte material is applied to one surface of the ultrafine fiber non-woven fabric UFN, but the slurry containing the solid electrolyte material may be applied to both surfaces of the ultrafine fiber non-woven fabric UFN. Further, in the second embodiment (FIG. 17), the slurry containing the solid electrolyte material may be applied to one surface of the ultrafine fiber non-woven fabric UFN by omitting the nozzle N2 and the heater H2.

Application Example 2

In the second embodiment, the positive electrode member and the negative electrode member are laminated with the solid electrolyte membrane 40 by a feeder. Alternatively, the laminated body of the positive electrode member EL1, the solid electrolyte membrane 40, and the negative electrode member EL2 may be formed by forming the mixture layer by applying and drying the slurry containing the active material and the solid electrolyte material on the solid electrolyte membrane 40, and further laminating the current collector on the mixture layer.

Application Example 3

In the second embodiment, the nozzle is used to apply the slurry containing the solid electrolyte material onto the ultrafine fiber non-woven fabric UFN, but a gravure coating machine may be used to apply the slurry. Alternatively, a gravure coating machine may be used for applying the slurry containing the active material and the solid electrolyte material of the above application example 2.

Application Example 4

In the second embodiment, the non-woven fabric (UFN) is formed of the resin to which cellulose nanofiber (CeNF) is added, but the addition of the cellulose nanofiber (CeNF) maybe omitted. In this way, the manufacturing apparatus (FIG. 11) described in the second embodiment can be used for manufacturing an all-solid-state battery using a non-woven fabric (UFN) to which cellulose nanofiber (CeNF) is not added. Further, the manufacturing apparatus described in the second embodiment can be used for manufacturing an all-solid-state battery using a non-woven fabric (UFN) to which a filler other than cellulose nanofiber (CeNF) is added.

As the filler, for example, natural materials such as ramie, jute, kenaf, bamboo, and bagasse, carbon materials such as carbon fiber, carbon nanofiber, carbon nanotube, fullerene, and carbon black, and mineral materials such as glass, calcium carbonate, titanium dioxide, and talc can be used in addition to cellulose containing CeNF. As the filler, a filler subjected to surface treatment may also be used.

Application Example 5

In the second embodiment (FIG. 11), the process by the twin-screw kneading extruder (S1), the process by the non-woven fabric manufacturing machine (S2), and the process by the all-solid-state battery laminate manufacturing machine (S3) do not have to be continuously performed.

For example, after extruding the molten resin as a strand by the twin-screw kneading extruder (S1), the strand may be cooled by a strand bath and sequentially cut into pellets by a strand cutter (cutting device). Then, after the pellets are melted to form strands having a desired diameter, the strand may be processed by the non-woven fabric manufacturing machine (S2).

Also, after winding the strand (raw material resin) obtained by extruding the molten resin by the twin-screw kneading extruder (S1) so as to have a desired diameter, the wound strand (raw material resin) having the desired diameter may be processed by the non-woven fabric manufacturing machine (S2).

Figure 17:
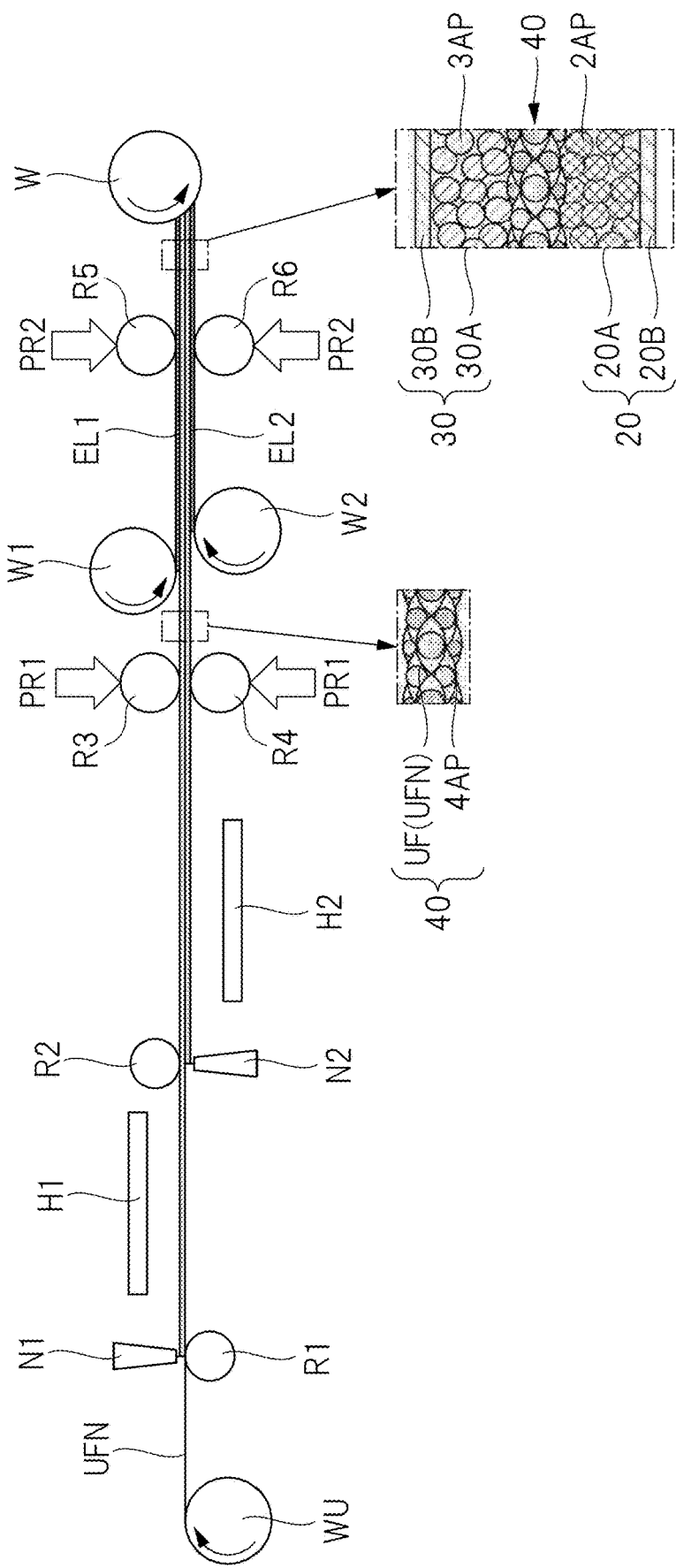
FIG. 17 is a diagram showing a configuration of an all-solid-state battery laminate manufacturing machine according to the application example 5.

Further, the non-woven fabric (UFN) formed by the non-woven fabric manufacturing machine (S2) may be wound up by the winding machine WU. Then, as shown in FIG. 17, the laminated body of the positive electrode member EL1, the solid electrolyte membrane 40, and the negative electrode member EL2 may be formed by sending out the wound non-woven fabric (UFN) as described in the second embodiment. FIG. 17 is a diagram showing a configuration of an all-solid-state battery laminate manufacturing machine according to the application example 5.

Further, the laminated body of the positive electrode member EL1, the solid electrolyte membrane 40, and the negative electrode member EL2 may be formed by using a non-woven fabric (UFN) formed and wound by a method other than the laser electrospinning (LES) method (FIG. 17).

Application Example 6

Figure 18:
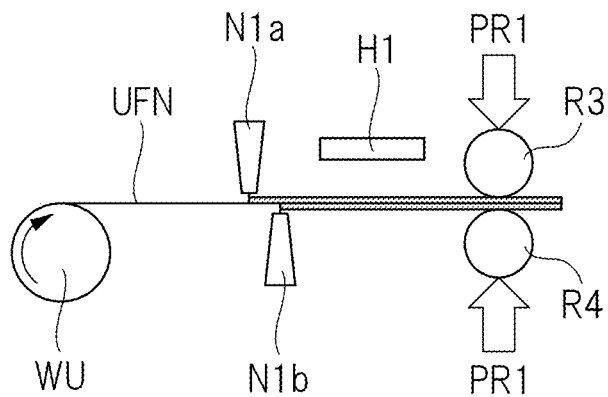
FIG. 18 is a diagram showing a configuration of an all-solid-state battery laminate manufacturing machine according to the application example 6.

In the second embodiment, heat is applied for each application of the slurry containing the solid electrolyte material to the ultrafine fiber non-woven fabric UFN, but the slurry on both surfaces of the ultrafine fiber non-woven fabric UFN may be heated at once by omitting the heater. FIG. 18 is a diagram showing a configuration of an all-solid-state battery laminate manufacturing machine according to the application example 6. For example, after applying the slurry onto the front surface of the non-woven fabric (UFN) by the nozzle Nia and applying the slurry onto the back surface of the non-woven fabric (UFN) by the nozzle Nib, the slurry is heated by the heater H1 and is pressurized by the rollers R3 and R4.

Application Example 7

Figure 19:
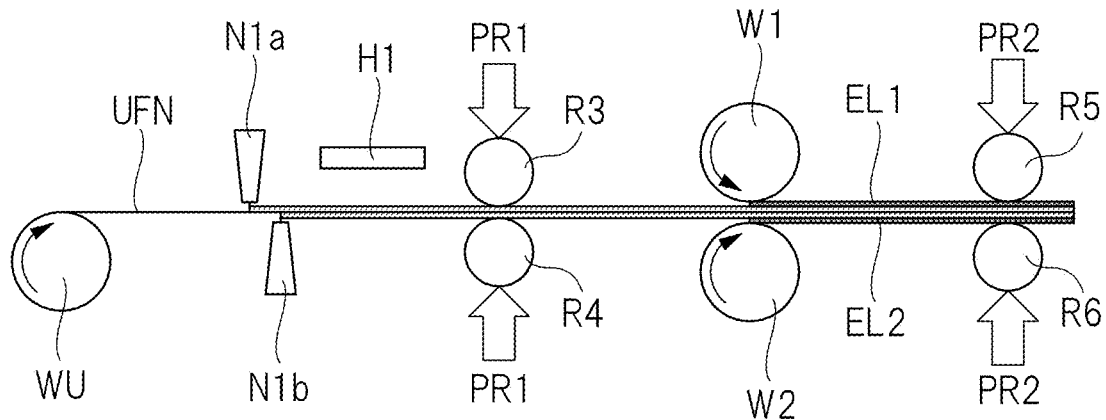
FIG. 19 is a diagram showing a configuration of an all-solid-state battery laminate manufacturing machine according to the application example 7.

For example, in the application example 6, two applied layers are provided by applying the slurry onto both surfaces of the non-woven fabric (UFN). Alternatively, a plurality of applied layers may be further provided. At this time, three or more applied layers may be provided using different solid electrolyte materials. FIG. 19 is a diagram showing a configuration of an all-solid-state battery laminate manufacturing machine according to the application example 7. For example, after applying the slurry onto the front surface of the non-woven fabric (UFN) by the nozzle Nia and applying the slurry onto the back surface of the non-woven fabric (UFN) by the nozzle Nib, the slurry is heated by the heater H1 and is pressurized by the rollers R3 and R4. Then, a different solid electrolyte membrane is laminated on the front surface of the applied layer from the feeder W1, and another different solid electrolyte membrane is laminated on the back surface of the applied layer from the feeder W2. Thereafter, the four layers of the solid electrolyte material are pressurized by rollers R5 and R6.

Application Example 8

Figure 20:
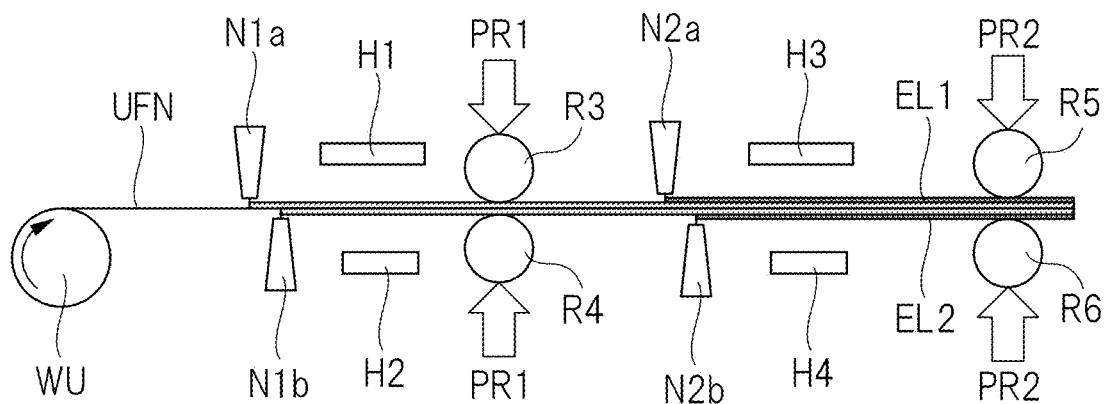
FIG. 20 is a diagram showing a configuration of an all-solid-state battery laminate manufacturing machine according to the application example 8.

FIG. 20 is a diagram showing a configuration of an all-solid-state battery laminate manufacturing machine according to the application example 8. The different solid electrolyte membranes sent from the feeders W1 and W2 of the above application example 7 may be formed by the application of the slurry from nozzles N2a and N2b and the heat treatment by the heaters H3 and H4.

In the foregoing, the invention made by the inventors of the present invention has been concretely described based on the embodiments and examples. However, it is needless to say that the present invention is not limited to the foregoing embodiments and examples and various modifications can be made within the range not departing from the gist thereof.

For example, in the foregoing description, a secondary battery has been described as an example of a lithium battery, but the present invention can be applied also to a primary battery. Also, a lithium battery has been described as an example, but the present invention can be applied also to other all-solid-state batteries. Further, CeNF having hydroxyl group (—OH) has been described as an example of a polar filler, but other fillers having a polar group may be used. Both an organic filler and an inorganic filler may be used as the filler.

Also, the embodiments, examples, and application examples described above may be combined in various ways within the range not departing from the gist thereof.

REFERENCE SIGNS LIST 1 raw material resin
2 roller
2AP negative electrode active material
3 nozzle
3AP positive electrode active material
4AP solid electrolyte particle
5 high voltage generation source
6 collector
7 ground potential
8 laser irradiation unit
9 slit
10 laser
11 cylinder
12 screw
13 hopper
14 die
15 rotation drive mechanism
17 plunger pump (liquid addition pump)
20 negative electrode
20A negative electrode mixture layer
20B negative electrode current collector
30 positive electrode
30A positive electrode mixture layer
30B positive electrode current collector
40 solid electrolyte membrane
111 forced exhaust port
112 vacuum pump (deaeration device)
160 injection nozzle
A plasticization zone (plasticization part)
B kneading zone (kneading part)
C devolatilization zone (deaeration part)
EL1 positive electrode member
EL2 negative electrode member
EM twin-screw kneading extruder (extruder)
H1 heater
H2 heater
H3 heater
H4 heater
N1 nozzle
N1a nozzle
N1b nozzle
N2 nozzle
N2a nozzle
N2b nozzle
PR1 press
PR2 press
R1 roller
R2 roller
R3 roller
R4 roller
R5 roller
R6 roller
S slurry
S1 process by twin-screw kneading extruder
S2 process by non-woven fabric manufacturing machine
S3 process by all-solid-state battery laminate manufacturing machine
UF ultrafine fiber
UFN ultrafine fiber non-woven fabric (non-woven fabric)
W winding machine
W1 feeder
W2 feeder
WU winding machine

The invention claimed is:

1. A method of manufacturing a solid electrolyte membrane for an all-solid-state battery comprising:
   (a) a step of forming a non-woven fabric having a fiber made of a resin;
   (b) a step of applying a slurry containing solid electrolyte particles onto the non-woven fabric;
   (c) a step of drying the slurry on the non-woven fabric by a heater; and
   (d) a step of pressurizing the slurry on the non-woven fabric by a roller,
   wherein the step (a) is a step of forming the non-woven fabric by making a resin containing a polar filler fibrous by a laser electrospinning method,
   the polar filler containing a polar group that makes the resin finer and more uniform.

2. The method of manufacturing the solid electrolyte membrane according to claim 1,
   wherein the polar filler is cellulose.

3. The method of manufacturing the solid electrolyte membrane according to claim 2,
   wherein the resin is polyethylene or polypropylene.

4. The method of manufacturing the solid electrolyte membrane according to claim 1,
   wherein the resin containing the polar filler is formed by kneading the polar filler and a molten resin by an extruder.

5. The method of manufacturing the solid electrolyte membrane according to claim 1,
   wherein the polar filler has a fiber length of 0.5 μm to 10 μm.

6. The method of manufacturing the solid electrolyte membrane according to claim 1,
   wherein the polar filler has a fiber diameter of 0.001 um to 10 μm.

7. The method of manufacturing the solid electrolyte membrane according to claim 1, further comprising a step of defibering the polar filler to reduce the polar filler fiber length and diameter.

\* \* \* \* \*